United States Patent [19]
Graeper

[11] 3,822,980
[45] July 9, 1974

[54] ROTATIONAL MOLDING APPARATUS
[75] Inventor: Michael R. Graeper, Lake Oswego, Oreg.
[73] Assignee: Plastico, Inc., Portland, Oreg.
[22] Filed: Mar. 30, 1972
[21] Appl. No.: 239,428

[52] U.S. Cl................ 425/429, 264/310, 425/435, 432/124
[51] Int. Cl............................................. B29c 5/04
[58] Field of Search........... 425/425, 429, 430, 435; 264/310, 311; 342/124

[56] References Cited
UNITED STATES PATENTS

| | | | |
|---|---|---|---|
| 2,977,104 | 3/1961 | Ott | 432/124 X |
| 3,003,188 | 10/1961 | Weiss | 254/310 X |
| 3,315,314 | 4/1967 | Barnett et al. | 425/435 X |
| 3,337,662 | 8/1967 | Spencer | 425/429 X |
| 3,454,988 | 7/1969 | Cremer | 425/435 X |
| 3,564,656 | 2/1971 | Barnett | 425/435 X |
| 3,566,443 | 3/1971 | Guerrero | 425/435 X |
| 3,570,061 | 3/1971 | Andrews | 425/435 X |
| 3,689,191 | 9/1972 | Westbrook et al. | 425/429 X |

Primary Examiner—Robert L. Spicer, Jr.
Attorney, Agent, or Firm—Kolisch, Hartwell & Dickinson

[57] ABSTRACT

Rotational molding apparatus including a mold-carrying frame which is mounted on a track for movement between a mold-working station and an oven. The oven is rotatable under power about a substantially horizontal axis and has a door on one of its sides. With the oven in one position, the door faces toward the mold-working station. The mold-carrying frame may be moved along the track and directly into or out of the oven through the doorway. With the door closed a substantially totally enclosed chamber is provided in the oven. Ducts in the oven are operable to circulate heated air about a mold rotated in the oven. The oven and mold frame may be rotated about the oven axis in either of reverse directions. The mold frame also is adapted to be rotated within the oven in either of reverse directions about an axis disposed at a substantial angle to the oven axis. The mold-working station includes an enclosure having a movable top which may be moved between a position overlying the mold in the station and a position where it is spaced laterally of the mold.

28 Claims, 8 Drawing Figures

PATENTED JUL 9 1974 3,822,980

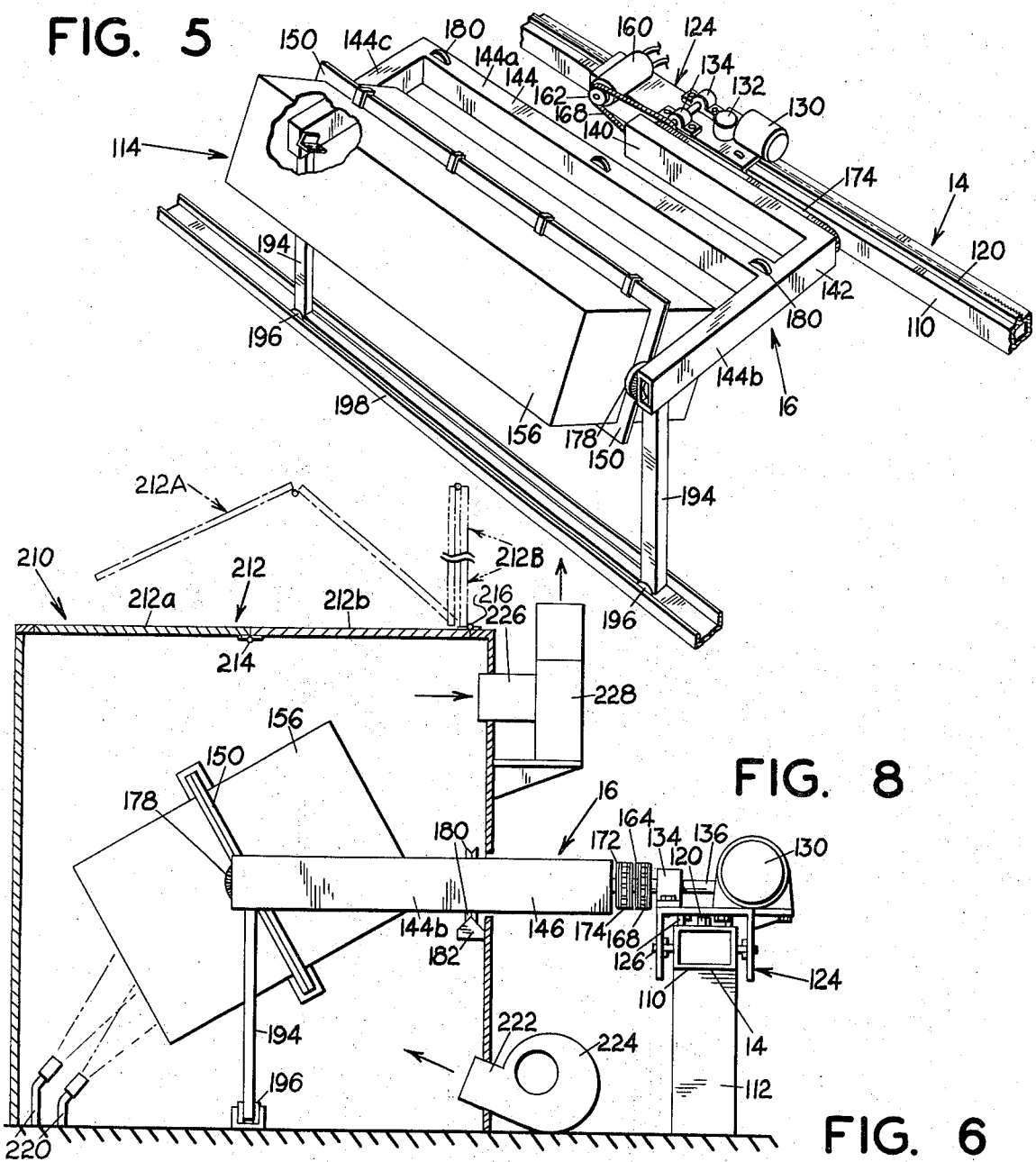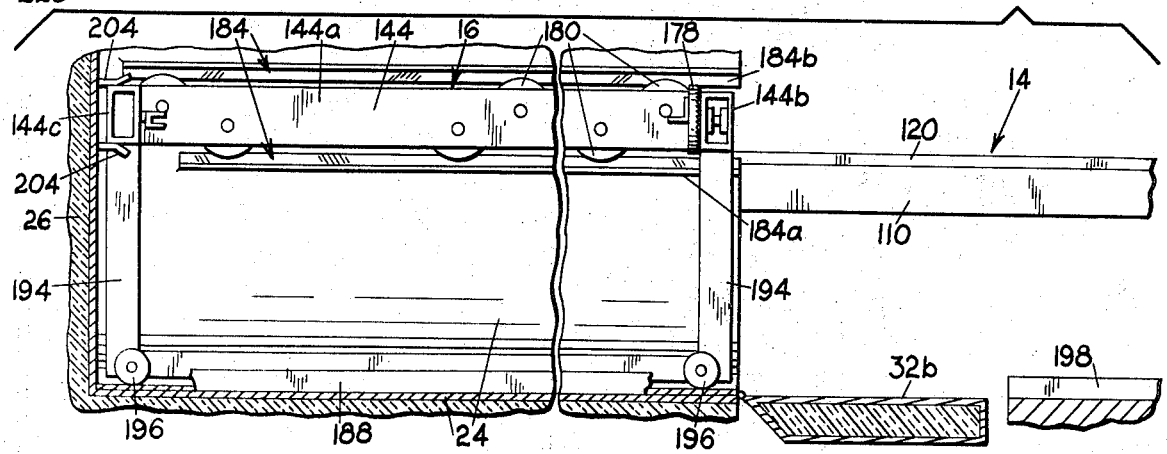

ROTATIONAL MOLDING APPARATUS

This invention relates to rotational molding apparatus.

Rotational molding is a process used to produce hollow articles from thermoplastic or thermosetting materials. The process includes placing a quantity of material to be molded into a hollow mold, rotating or rocking the mold about a pair of divergent axes, and heating the mold as it is rotated or rocked. As this occurs the material flows over the interior of the mold, completely coating it and producing a hollow article. In the use of thermoplastic material, once the material has been rotated with the application of heat to cause material to flow entirely about the interior of the mold, the mold is cooled while rotated to set the material in the desired shape.

Apparatus has been devised in the past for performing such a process, however, such have not been entirely satisfactory. Previous devices generally have heated a mold either by directing a flame or heated fluid against the mold, with the mold unenclosed, or have rotated the mold within a large stationary oven. Both of these methods are uneconomical as they require heating greater quantities of fluid than is necessary.

A general object of the present invention is to provide novel apparatus for rotational molding, which overcomes the above-noted defiencies of previous apparatus.

More specifically, an object of the invention is to provide rotational molding apparatus which includes a novel oven rotatable about a substantially horizontal axis with a mold-carrying frame therein being rotated about the same axis. The mold-carrying frame is rotatable also in the oven about a second axis disposed at a substantial angle to the oven axis. With such a rotatable oven, the enclosed chamber within which the mold rotates and which is heated, need be only slightly larger than the mold itself, and thus conservation of heat and fuel may be effected.

Another object of the invention is to provide novel rotational molding apparatus which includes a rotatable oven defining an enclosed chamber within which a mold is rotated, with the oven including inlet and outlet ducts connected by conduit means on the oven, means for circulating a heated fluid through the conduit means and enclosed chamber by way of the inlet and outlet ducts, and means for periodically heating the circulated fluid. By the provision of circulating heated fluid around the mold, more efficient heating is provided.

Yet another object of the invention is to provide novel rotational molding apparatus which includes an oven rotatable about a substantially horizontal axis and having a door in one of its sides; the oven being rotatable to a position in which the door faces substantially horizontally outwardly in one direction from the oven. A mold-carrying frame operable to support and rotate a mold about a pair of divergent axes, is movable independently of the oven into and out of the oven through such door. With such apparatus, rotational molding apparatus is provided which may be efficiently loaded and unloaded by straight-in entry of a mold-carrying frame into the oven.

Still another object of the invention is to provide such novel apparatus wherein the mold-carrying frame is supported on a track-mounted carriage for movement from a mold-working station spaced from the oven to a position adjacent the oven. The mold-carrying frame is rotatable on the carriage about an axis substantially paralleling the axis of the oven and is so constructed that with the carriage adjacent the oven, at least a portion of the mold-carrying frame and a mold supported thereon are received in the oven. Further, the apparatus is so constructed that when the carriage is in proper position adjacent the oven an axis of rotation for the mold-carrying frame coincides with the axis of rotation for the oven, whereby they may be rotated together.

A still further object of the invention is to provide novel rotational molding apparatus including a rotatable oven having a door on one of its sides with selectively operable stop means for stopping the oven in either of selected positions, with the oven in one of its positions having its door facing in one direction and with the oven in another stopped position, having its doorway facing another direction. With such construction, the oven may be positioned whereby mold-carrying frames may be inserted or removed from the oven and moved to stations at different sides of the oven. This permits the use of multiple mold-working stations, whereby a mold on one mold-carrying frame may be cooled and recharged while another is rotated and heated in the oven.

A further object is to provide in such rotational molding apparatus a novel mold cooling and charging station which includes an enclosure having a movable top and coolant spray devices for directing a flow of coolant fluid against a mold within the enclosure. The use of a coolant fluid leads to evaporation of the fluid as it cools a mold and such evaporation collects on the roof of the enclosure. With the roof on such an enclosure being movable to a position other than over the mold after the cooling process such station may also be used for charging the mold with no concern for water dripping into the mold as it is recharged.

These and other objects and advantages will become more fully apparent as the following description is read in conjunction with the drawings, wherein:

FIG. 5 is a perspective view, on a reduced scale, of the mold-carrying frame illustrated in FIG. 4;

FIG. 6 is a view taken generally along the line 6—6 in FIG. 3 with portions broken away;

FIG. 8 is a cross-sectional view through a mold-working station adjacent one end of the apparatus.

Figure 1:
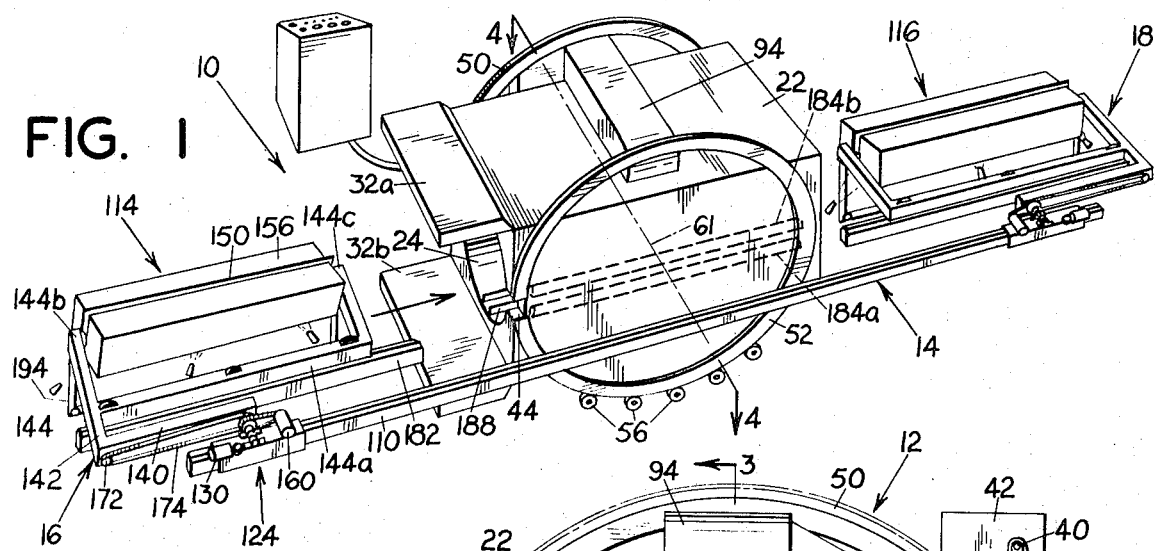
FIG. 1 is a perspective view of apparatus according to the invention.

Referring now to the drawings, and first more specifically to FIG. 1, at 10 is indicated rotational molding apparatus according to the invention. The apparatus includes generally an oven 12 which is mounted for rotation about a substantially horizontal axis, an elongated track 14 extending substantially horizontally adjacent one end of the oven, and a pair of mold-carrying frames 16, 18 which are movable along track 14 for insertion individually into oven 12 for rotation therewith.

Figure 2:
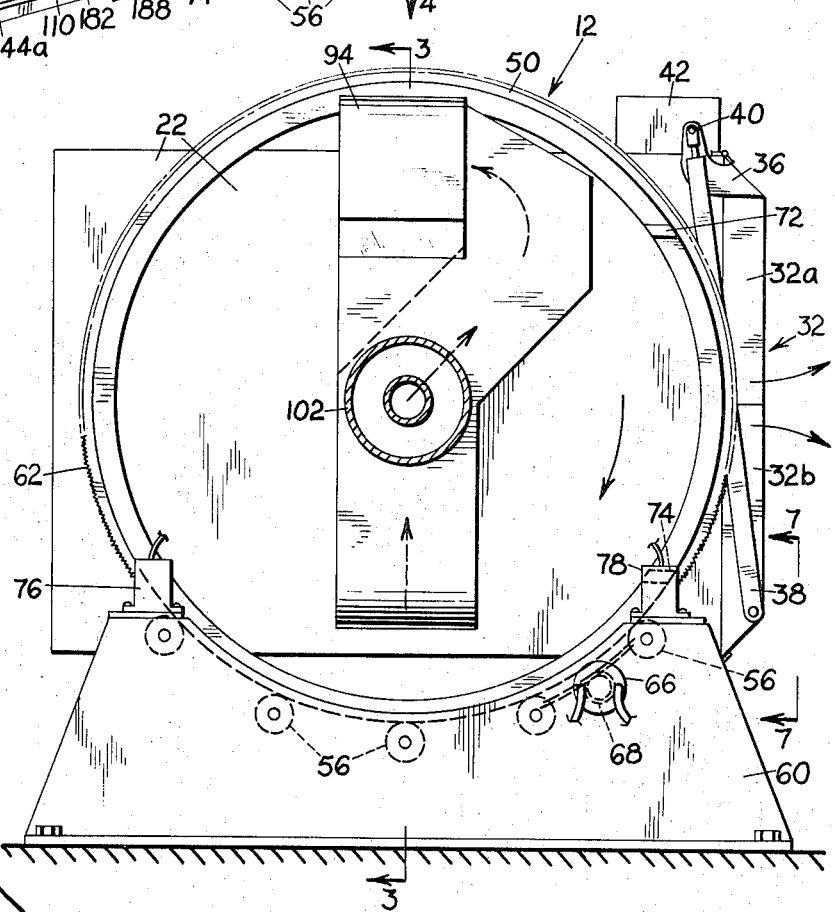
FIG. 2 is an enlarged end view of a rotatable oven in the apparatus taken from the side of the apparatus opposite that shown in FIG. 1.
Figure 3:
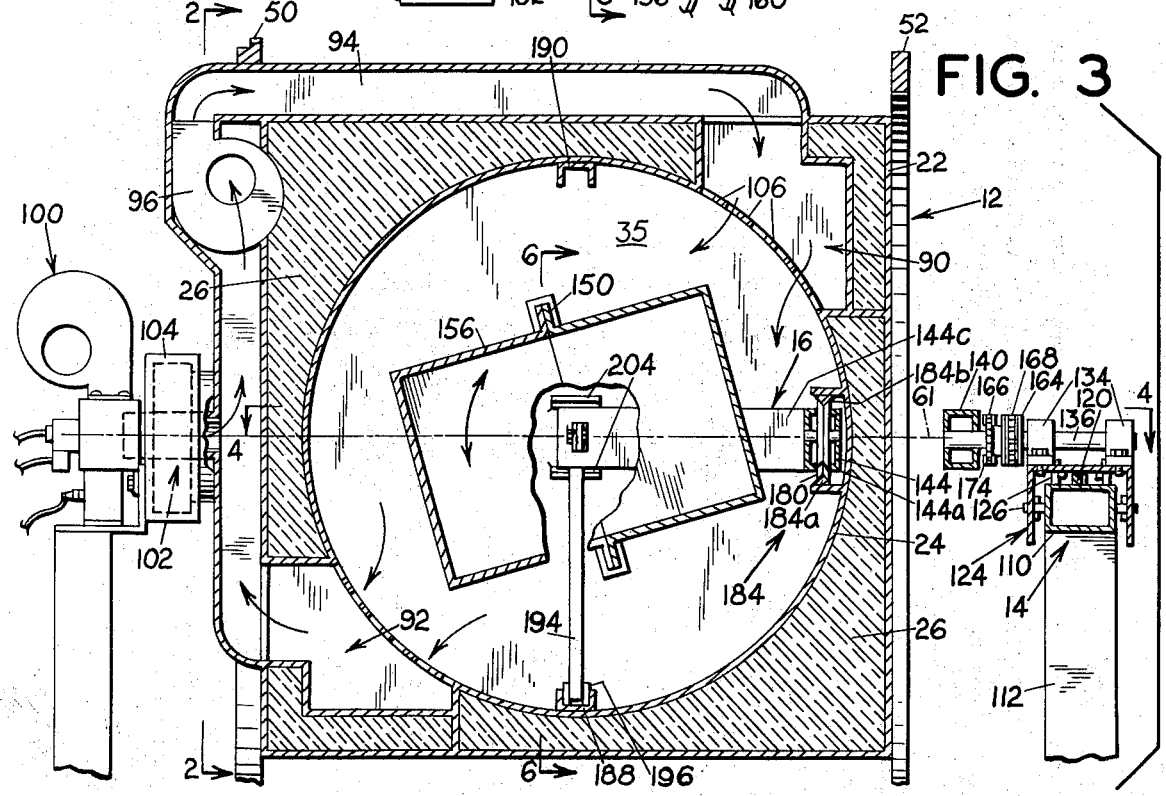
FIG. 3 is a cross-sectional view of the oven and adjacent structure taken along the line 3—3 in FIG. 2.

Describing oven 12, and referring to FIGS. 1, 2 and 3, such includes a substantially box-like outer wall 22 and a substantially cylindrical inner wall 24 spaced inwardly from wall 22. The space between the inner and outer walls is filled with a heat insulating material 26 to inhibit heat loss from the interior of the oven.

An insulated door 32, having upper and lower portions 32a, 32b hingedly connected at their top and bottom edges, respectively, on one side of the oven, is operable to close off a doorway which opens into the interior of the oven. The side of the oven opposite the door is closed off by a solid, insulated wall 35. With the door closed a substantially totally enclosed heating chamber is defined in the oven.

Referring particularly to FIG. 2, a somewhat L-shaped plate 36 is secured to one edge of door portion 32a. Plate 36 extends inwardly and upwardly on the oven to a region behind the hinge for door portion 32a. One end of an elongated, rigid bar 38 is pivotally connected at 40 to the upper end of member 36 while the opposite end of the bar is pivotally connected to an outer edge of door portion 32b on the opposite side of its hinge connection with the oven. Power-actuated door opening means 42, shown only schematically, is operable to force the upper end of plate 36 downwardly and toward the oven. This swings door portion 32a outwardly and upwardly away from the side of the oven, and, through bar 38, swings door portion 32b downwardly and outwardly away from the side of the oven, thus to open up the doorway in the side of the oven.

A notch 44 (see FIGS. 1 and 4) is defined adjacent the doorway at the end of the oven nearest track 14. The side of the notch facing the door is closed off by the door when it is closed and is opened up when the door is opened. The purpose for this notch will be discussed below.

Figure 7:
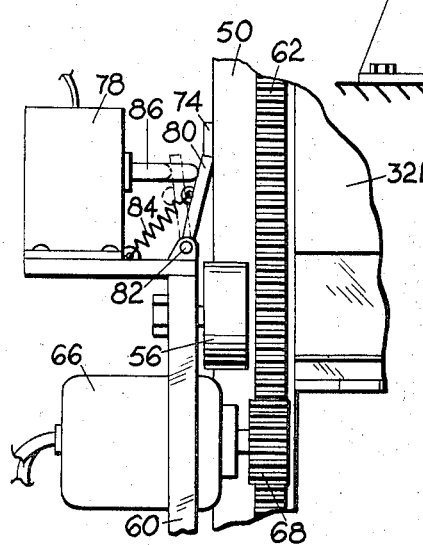
FIG. 7 is an enlarged view taken generally along the line 7—7 in FIG. 2.

A pair of upright annular support members, or rings, 50, 52 are secured to the oven adjacent its opposite ends. Each ring has a substantially smooth peripheral portion which rides on a plurality of rollers, such as those illustrated at 56 in FIGS. 1, 2, and 7. Referring specifically to FIGS. 2 and 7, rollers 56 are journaled on an upright support plate 60, which is secured to the floor, and are disposed with their upper surfaces in a convex path conforming to the shape of the peripheral support edges of the rings. These rings and rollers mount the oven for rotation about a substantially horizontal axis which is indicated by dot-dash line 61 in FIGS. 1, 3, and 4.

Ring 50 also has gear teeth 62 extending about its peripheral edge. A reversible, variable speed hydraulic motor 66 secured to plate 60 has a spur gear 68 secured to its drive shaft which engages gear teeth 62. Operation of motor 66 produces rotation of the oven about axis 61 in either of reverse directions at selectively variable speeds.

The oven may be stopped and held either in the position shown in FIG. 2, with its door facing substantially horizontally outwardly to the right in the figure, or with its door facing in the opposite direction. Means for stopping and holding the oven in a desired position includes a pair of lugs 72, 74 secured to the near side of the oven as seen in FIG. 2 and FIG. 7, and a pair of laterally spaced, power-actuated dogs 76, 78 mounted on support plate 60. Each lug, and referring specifically to lug 74 seen in FIG. 7, projects outwardly from the oven.

Each dog, and referring specifically to dog 78, includes an upright stop plate 80 pivotally connected at its lower end at 82 to the support plate for swinging about a substantially horizontal axis between the two positions shown for the plate in FIG. 7. In a stop position, as shown in solid outline, the plate is positioned in the path of the lugs as they rotate with the oven, thus to stop the oven. In an open position, as shown in dashed outline, the stop plate is out of the path of the lugs. A spring 84 biases the stop plate toward its open position. A pin 86 actuated by a solenoid 88 engages one side of plate 80. Actuation of the solenoid in one direction shifts the stop plate to the right in FIG. 7 and into the path of a lug and actuation of the solenoid in the opposite direction moves the pin to the left, whereby spring 84 may draw the plate out of the lug path. With the oven rotated in a clockwise direction as seen in FIG. 2, dog 78 may be actuated to engage lug 74 to stop the oven in the position shown. With the oven rotated in a counterclockwise direction dog 76 may be actuated to engage lug 72 to stop the oven in a position with the door facing to the left in FIG. 2.

Referring again to FIG. 3, the oven has mounted thereon ductwork providing an inlet duct indicated generally at 90 opening into the enclosed chamber within the oven, an outlet duct 92 opening out of the chamber, and a recirculating conduit 94 interconnecting the outlet and inlet ducts. An electrically operated blower 96 in the conduit is operable to circulate air through the conduit, ducts, and oven chamber.

A stationary burner, or heater, 100 is connected to the conduit through a rotatable, hollow coupling indicated generally at 102. The burner is operable periodically to introduce a flame through the hollow rotatable coupling and into the conduit, to heat the air circulated therethrough to maintain a relatively constant temperature within the oven. Thermostatic controls on the oven are provided for controlling operation of the burner to maintain a desired temperature in the oven chamber. The rotatable coupling also includes a plurality of wiper switches enclosed in a housing 104 operable to transmit power from a stationary source outside the oven to electrically operated devices rotating with the oven. Louvers, or baffles, such as those indicated at 106, may be provided in inlet duct 90 to produce a more even distribution of heated air into the chamber.

Figure 4:
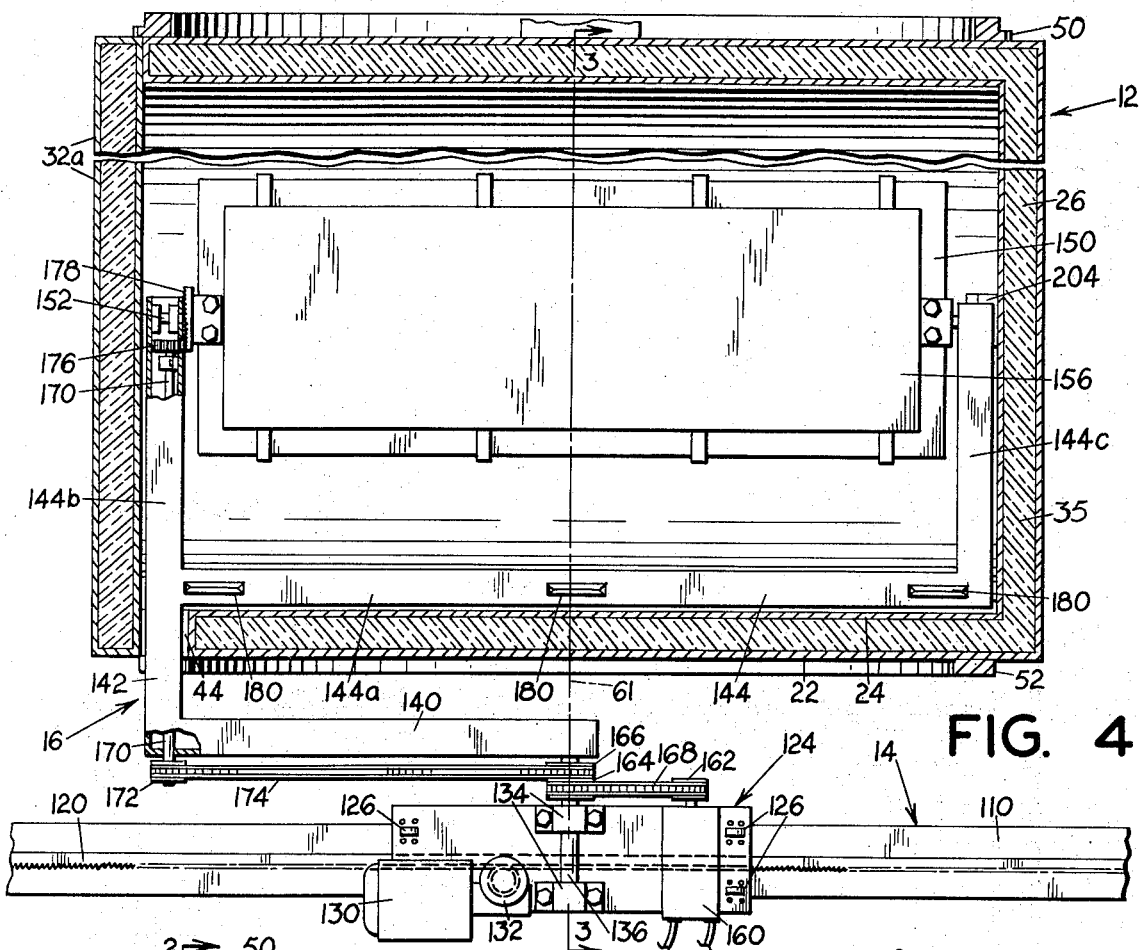
FIG. 4 is a view taken generally along the line 4—4 in FIG. 3.

Referring now specifically to FIGS. 3 and 4, track 14 includes a box beam 110 of substantially rectangular cross section supported above the floor by a plurality of support posts, a portion of one of which is illustrated at 112 in FIG. 3. The beam extends continuously from a first mold-working station, indicated in FIG. 1 generally at 114 and spaced laterally to one side of the oven, past the oven, to another mold-working station, indicated generally at 116 and spaced a distance to the opposite side of the oven. An elongated rack gear 120 extends fully along and is secured to the top of beam 110. The rack gear has a plurality of gear teeth on one of its upright sides.

Each of mold-carrying frames 16, 18 are similarly constructed, and thus only frame 16 and its mounting on the track will be described in detail. Referring to FIGS. 3 and 4, an elongated carriage 124 having an inverted U-shaped cross section, as seen in FIG. 3, is supported for movement along track 14 by a plurality of rollers 126 which bear against the top and sides of beam 110. A reversible motor 130 is connected, through a right angle drive 132, to a spur gear which engages the teeth on rack gear 120. Actuation of the motor is operable to drive the carriage in either of reverse directions along track 14.

A pair of spaced bearings 134 on the carriage rotatably mount a shaft 136 which extends outwardly from the carriage toward the oven. The axis of rotation of shaft 136 is substantially horizontal and parallels the axis of rotation for the oven. Mold-carrying frame 16 is mounted on shaft 136, as is best seen in FIGS. 3, 4, and 5.

The mold-carrying frame includes an elongated arm portion 140 secured adjacent one of its ends to and extending normally outwardly from one end of shaft 136. A joining portion 142 projects normally outwardly from the opposite end of arm portion 140 in a direction away from the track. A yoke portion 144 is secured to joining portion 142 and is spaced laterally from arm portion 140. The yoke portion includes an elongated member 144a and a pair of elongated forks 144b, 144c. Member 144a extends substantially parallel to arm portion 140 and transversely of the rotational axis provided by shaft 136. Forks 144b, 144c, which are substantially parallel, project substantially normally outwardly from opposite ends of member 144a in a direction away from arm portion 140. Arm portion 140, joining portion 142, member 144a and forks 144b, 144c all are constructed of hollow members having box-like cross sections and together form what is referred to herein as a first frame.

A second and substantially rectangular frame 150 is journaled for rotation adjacent its opposite ends at the outer extremeties of forks 144b, 144c. The axis of rotation for frame 150 extends substantially normal to the axis of shaft 136. A bearing and shaft combination 152 supporting one end of frame 150 is illustrated generally where a portion of fork 144b has been broken away.

An elongated, hollow mold 156 is illustrated supported on frame 150. The mold thus is mounted for rotation about the axis of shaft 136 and about another axis extending through the journal connections between frame 150 and forks 144b, 144c, which is substantially normal to and extends transversely of the axis of shaft 136. The mold thus may be rotated about a pair of divergent axes while mounted on such frames.

It will be understood that frame 150 and mold 156 may take any required shape, so long as they have dimensions which permit them to rotate within the oven. Further, it will be understood that a plurality of molds may be mounted on frame 150 for producing multiple articles in a single operating sequence.

Referring still to FIG. 4, a reversible, variable speed hydraulic motor 160 is mounted on carriage 124. The axis of rotation of the drive shaft of motor 160 substantially parallels shaft 136. A sprocket 162 is secured on the drive shaft. A pair of side-by-side, keyed-together sprockets 164, 166 are mounted on shaft 136 for rotation relative thereto. A drive chain 168 is trained over sprockets 162, 164. An elongated drive shaft 170 is journaled internally of joining portion 142 and fork 144b. A sprocket 172 is secured to the end of shaft 170 which projects outwardly from the frame. Trained over sprockets 166, 172 is a second drive chain 174. A bevel gear 176 secured to the opposite end of shaft 170 engages a bevel gear 178 secured to frame 150. Such sprockets, chains, drive shaft and bevel gears provide a driving connection between motor 160 and frame 150, whereby operation of motor 160 produces rotation of frame 150 and a mold supported thereon about an axis extending substantially normal to the axis of shaft 136.

This driving connection may be maintained while frame 16 is rotated about the axis of shaft 136. Further, with motor 160 being reversible and operable at variable speeds, frame 150 and a mold supported thereon may be rotated in either of reverse directions through a wide range of speeds.

Referring to FIGS. 3, 4, and 6 a plurality of grooved wheels 180 are journaled on member 144a of the frame. Some of wheels 180 project above member 144a, while others project below member 144a. The wheels are adapted to provide additional support for the frame while at a mold-working station by resting on a secondary track, such as that indicated generally at 182 in FIGS. 1 and 8. Another secondary track 184 having elongated, substantially parallel track members 184a, 184b secured to the inner wall of the oven, (see FIGS. 1, 3, and 6) is adapted to support yoke 144 when inserted in the oven. Members 184a, 184b are disposed substantially horizontal when the oven is positioned as shown in the figures, and are spaced apart vertically on opposite sides of the rotational axis for the oven a distance slightly greater than the upper and lower limits of the projection of wheels 180.

Referring to FIGS. 3 and 6, an elongated channel 188, is secured to the bottom of the oven and a similar channel 190 is secured to the top of the oven. A substantially U-shaped support member 194 is secured at its upper ends to forks 144b, 144c. Rollers 196 journaled adjacent opposite ends of the lower cross bar of member 194 are adapted to provide rolling support in the channels. Referring to FIGS. 5 and 6, a similar channel 198 is mounted at each mold-working station and is substantially aligned with channel 188.

Explaining now the operation of the apparatus thus far described and assuming that the elements are in the position illustrated in FIG. 1, mold 156 is charged at station 114 with a predetermined quantity of molding material. The mold is closed and motor 130 is actuated to drive the carriage and frame 16 along track 14 toward the oven. As the carriage, frame, and mold are carried toward the oven the frame is supported by shaft 136, wheels 180 running on secondary track 182, and member 194 running on rollers 196. Motor 130 drives the mold-carrying frame and mold along a substantially horizontal, continuous unbroken path into the oven. As forward end portions of frame 150, mold 156 and yoke 144 enter the oven through the doorway wheels 180 engage track 184 in the oven and member 194 rides onto channel 188.

When frame 150, yoke 144, and mold 156 are fully inserted into their proper positions in the oven, joining portion 142 of the mold-carrying frame extends through notch 44 adjacent the oven door (see FIG. 4). The notch is of such size that it closely surrounds three sides of joining portion 142, and door portions 32a, 32b, when closed, close the remaining side of the notch, thus effectively to close the chamber within the oven. With the frame in the position illustrated in FIGS.

3, 4 and 6, arm 140 extends along the outside of a portion of the oven.

The end of fork 144c further is supported in the oven by plates 204 secured to wall 35 in the oven (see FIGS. 3, 4 and 6). These plates engage the top and bottom of the fork. The yoke portion of the mold-carrying frame thus is received in the oven in a preselected position relative to the oven and will be maintained in such position relative to the oven throughout rotation.

When the mold is enclosed in the oven by closing of door 32 burner 100 is operated to heat air in conduit 94, and blower 96 circulates such through the oven chamber. Simultaneously with the circulation of heated air through the chamber, motor 66 is operated to rotate the oven about its central axis. This produces rotation of the oven, frame 16, and mold 156 about the axis indicated at 61. Motor 160 is operated to rotate frame 150 and mold 156 within the oven. As has been mentioned previously, the direction of rotation of the oven and of the mold within the oven may be changed at any time and the speed with which they are rotated is variable. The speeds and directions of rotation of the oven and main frame thus may be controlled independently of the speed and direction of rotation of frame 150, thus to insure that molding material fully coats the interior of the mold.

Once the mold has been heated and rotated as required, the oven is stopped by actuation of dog 78 to place the oven in the position shown in FIG. 1, with its door facing substantially horizontally outwardly toward mold-working station 114. Door portions 32a, 32b are opened and motor 130 is operated to drive the mold-carrying frame and mold back to its respective charging and cooling station.

The oven then may be rotated to place its doorway facing in an opposite direction, toward station 116, in which position it may receive mold frame 18 and its associated mold. The above sequence then may be repeated with the second mold.

Referring to FIG. 8, a mold charging and cooling station includes an enclosure 210 within which the mold-carrying frame and mold are received. The enclosure is substantially box shaped, having upright walls and a top 212.

Top 212 of the enclosure includes a pair of sections 212a, 212b hingedly connected at an adjacent set of edges at 214. The opposite edge of section 212b is hingedly connected at 216 to an upright wall of the enclosure. The top may be positioned as shown in solid outline, closing off the top of the enclosure, or it may be swung upwardly, through the position shown in dot-dashed outline 212A to a stored position, shown in dot-dashed outline 212B, completely away from a position over a mold in the enclosure.

A plurality of spray nozzles, such as those indicated generally at 220 are mounted adjacent the floor of the enclosure and are directed upwardly toward the region occupied by a mold in the enclosure. The nozzles are connected to an appropriate source of coolant fluid, such as water, which may be sprayed upwardly and against a mold to be cooled. Adjacent the opposite side of the enclosure is an air inlet duct 222 through which coolant air may be directed from a blower 224 into the enclosure and against a mold. An outlet duct 226 opens outwardly from an upper portion of the enclosure and is connected to an exhaust fan 228.

In operation, with the mold-carrying frame and mold received within the enclosure, the sides and top of the enclosure are closed. The mold is rotated within the enclosure by motor 160 on the carriage. Coolant fluid, such as water, is sprayed from nozzles 220 against the mold to cool it as it rotates and air is blown through duct 222 into the region of the mold. Air and water vapors are exhausted from the enclosure after then pass over the mold through exhaust duct 226. In such a cooling process condensate will collect in drops on the underside of top 212.

Once the mold has been cooled as required, the top of the enclosure is swung back and away from its position over the mold to the position shown at 212B. In this way, drops of condensate, which may have accumulated on the top, are not in a position to drop on or into the mold. The mold thus may remain in the enclosure while it is opened to remove a molded article therefrom, and while a new charge of mold-forming material is placed in the mold.

While a preferred embodiment of the invention has been described herein, it should be apparent to those skilled in the art that variations and modifications are possible without departing from the spirit of the invention.

It is claimed and desired to secure by Letters Patent:

1. Rotational molding apparatus comprising
an oven defining a substantially totally enclosed heating chamber, said oven having a door in one of its sides,
means for supporting said oven for rotation about a substantially horizontal axis,
a mold-carrying frame in said oven mounted for rotation with said oven about the oven axis and for rotation relative to said oven about a second axis disposed at a substantial angle relative to the oven axis,
means for rotating the oven, mold-carrying frame, and a mold carried thereby about the oven axis,
means for rotating said frame about said second axis,
means for circulating a fluid through said chamber, and
means spaced outwardly from said heating chamber for heating such fluid prior to such fluid being circulated through said chamber.

2. The apparatus of claim 1, wherein said means for circulating fluid comprises a fluid inlet duct on the oven opening into said chamber, a fluid outlet duct on the oven exiting from the chamber, conduit means interconnecting said inlet and outlet ducts, and a blower in said conduit means.

3. The apparatus of claim 2, wherein the oven and conduit means are rotatable relative to said heating means and which further comprises a rotatable hollow coupling through which heated fluid may pass connecting said heating means to the conduit means.

4. The apparatus of claim 1, wherein said means for rotating the oven and mold-carrying frame comprises a reversible motor operable selectively to rotate the oven and mold frame in either of reverse directions about the oven axis.

5. The apparatus of claim 4, wherein said motor is operable at selectively variable speeds.

6. The apparatus of claim 1, wherein said means for rotating said mold-carrying frame about said second axis comprises a reversible motor operable selectively to rotate the frame in either of reverse directions about said second axis.

7. The apparatus of claim 6, wherein said motor is operable at selectively variable speeds.

8. Rotational molding apparatus comprising an oven mountd for rotation about a substantially horizontal axis, said oven having a door in one of its sides to provide an entry into said oven and being rotatable to a position in which the door faces outwardly in one direction from said oven, a mold-working station spaced laterally of said oven in said one direction, a mold-carrying frame, mounting means mounting said frame for rotation about a first axis paralleling the axis for the oven and a second axis disposed at a substantial angle relative to said first axis, and transport means connected to said mounting means operable to move said mounting means and frame along a substantially continuous path between a first position at said mold-working station and a second position wherein said frame is received through said entry and in said oven with its first axis coinciding with the axis for the oven.

9. The apparatus of claim 8, wherein said transport means comprises a track extending from a position adjacent said station to a position adjacent said oven and a carriage mounted on said track for movement therealong.

10. The apparatus of claim 8, wherein said oven door faces substantially horizontally outwardly from the oven when the oven is in said position, and wherein said transport means comprises a track along which the mold-carrying frame may be moved in a substantially horizontal, continuous path between said first and second positions.

11. The apparatus of claim 8, wherein said oven defines a substantially totally enclosed heating chamber, and which further comprises means for circulating a fluid through said chamber and means spaced outwardly from said heating chamber for heating such fluid prior to such fluid being circulated through said chamber.

12. The apparatus of claim 11, wherein said means for circulating fluid comprises a fluid inlet duct opening into said chamber, a fluid outlet duct exiting from the chamber, conduit means on the oven interconnecting said inlet and outlet ducts, and a blower in said conduit means.

13. The apparatus of claim 12, wherein the oven and conduit means are rotatable relative to said heating means, and which further comprises a rotatable hollow coupling through which heated fluid may pass connecting the heating means and the conduit means.

14. Rotational molding apparatus comprising an oven mounted for rotation about a substantially horizontal axis and having a door in one of its sides openable to provide an entry into the oven, said oven being rotatable to a position where the door faces outwardly in one direction from the oven, a mold-working station spaced laterally of said oven in said one direction, a track extending from said mold-working station toward said oven, a carriage mounted for movement on said track along a substantially continuous path between a first position at said station and a second position adjacent said oven, a first frame rotatably joined to said carriage for movement therewith between said first and second positions, said frame being so positioned on the carriage that at least a portion of the frame enters the oven through said entry and is received in the oven when the carriage is moved to its said second position, said frame being rotatable relative to said carriage about a first frame axis which coincides with the oven axis when in said second position, a second frame, means mounting said second frame on said first frame for rotation relative thereto about a second frame axis which extends at a substantial angle relative to the first frame axis, said second frame being mounted on said portion of the first frame which is received in said oven when the carriage is moved to its second position, and power-operated means for rotating the oven, first frame, and second frame about their respective axes when said portion of said first frame and said second frame are received in said oven.

15. The apparatus of claim 14, wherein said track is substantially horizontal.

16. The apparatus of claim 14, which further comprises power-operated means for moving said carriage along said track between said first and second positions.

17. The apparatus of claim 14, wherein said means for rotating said second frame comprises a motor mounted on said carriage and drive means on said first frame operatively interconnecting said motor and second frame for producing rotation of the latter on operation of the former.

18. The apparatus of claim 14, wherein said means for rotating said second frame comprises a reversible variable speed motor operable to produce rotation of said second frame in either of reverse directions about the second frame axis at selectively variable speeds.

19. The apparatus of claim 14, wherein said means for rotating the oven comprises a reversible variable speed motor operable to rotate said oven in either of reverse directions at selectively variable speeds.

20. Rotational molding apparatus comprising an oven mounted for rotation about a substantially horizontal axis and having a door in one of its sides openable to provide an entry into the oven, said oven being rotatable to a position where the door faces outwardly in one direction from the oven, a mold-working station spaced laterally of said oven in said one direction, a track extending from said mold-working station toward said oven, a carriage mounted for movement along said track between a first position at said station and a second position adjacent said oven, a first frame mounted on said carriage for movement therewith between said first and second positions and being so positioned on the carriage that at least a portion of the frame is received in the oven through said entry when the carriage is moved to its said second position, said first frame comprising an elongate arm portion spaced laterally of said track and journaled for rotation adjacent one of its ends on the carriage about a first frame axis which coincides with the oven axis when in said second position, a joining portion secured to and projecting laterally from said arm portion away from said track in a region spaced from the journal connection between the arm and carriage, and a yoke portion secured to said joining portion and spaced laterally of said arm portion, a second frame, means mounting said second frame on the yoke portion of said first frame for rotation relative thereto about a second frame axis which extends at a substantial angle relative to the first frame axis, and power-operated means for rotating the oven, first frame, and second frame about their respective axes.

21. The apparatus of claim 8, which further comprises power-operated means for rotating said oven and frame about the oven axis and for rotating said frame about said second axis when the frame is received in the oven.

22. The apparatus of claim 20, wherein said oven has a notch formed therein adjacent said door through which said joining portion may extend, with said arm portion outside the oven and the yoke portion inside the oven.

23. The apparatus of claim 22, wherein one side of said notch is closed off by the oven door when the same is closed, and is opened up when the door is opened.

24. The apparatus of claim 20, wherein said yoke portion is adapted to be received in said oven when the yoke is disposed in a preselected position relative to said oven, and wherein said oven further includes means for maintaining the yoke in said preselected position relative to the oven as the oven and frame are rotated about the oven axis.

25. Rotational molding apparatus comprising an oven mounted for rotation about a substantially horizontal axis, said oven having a door in one of its sides and being rotatable to a position in which the door faces outwardly in one direction from the oven, a mold-working station spaced laterally of the oven in said direction, a mold-carrying frame, means mounting said frame for rotation about a pair of divergent axes, and transport means for moving said mounting means and mold-carrying frame along a substantially continuous path between a first position at said station and a second position wherein said frame is received in said oven with one of said axes for the frame coinciding with the oven axis.

26. Rotational molding apparatus comprising an oven mounted for rotation about a substantially horizontal axis, said oven having a door in one of its sides and being rotatable to a first position where the door faces outwardly in one direction from the oven and a second position in which the door faces outwardly in a second direction from the oven, said door being openable when the oven is in either of said positions to provide an entry into the oven, means for stopping said oven in a selected one of said positions, a first mold-working station spaced laterally of the oven in one of said directions, a second mold-working station spaced laterally of the oven in said second direction, a mold-carrying frame, means mounting said frame for rotation about a first axis paralleling the axis for the oven and for rotation about a second axis disposed at a substantial angle relative to said first axis, and transport means for moving said mounting means and mold-carrying frame along a substantially continuous path between a first position at one of said stations and a second position wherein said frame is received in said oven with the first axis for the frame coinciding with the axis of the oven.

27. The apparatus of claim 26, wherein said transport means comprises track means extending from said station to a region adjacent said oven and a carriage mounted on said track means for movement therealong.

28. The apparatus of claim 26, which further comprises a second mold-carrying frame, means mounting said second frame for rotation about a first axis paralleling the axis of the oven and for rotation about a second axis disposed at a substantial angle relative to said first axis, and second transport means for moving said second mold-carrying frame along a substantially continuous path between the other of said mold-working stations and a position wherein said frame is received in said oven with the first axis for said second frame coinciding with the axis of the oven.

* * * * *